United States Patent [19]

Simon

[11] 4,293,457
[45] Oct. 6, 1981

[54] SEALERLESS PRIMERS

[75] Inventor: Martin J. Simon, Natrona Heights, Pa.

[73] Assignee: PPG Industries, Inc., Pittsburgh, Pa.

[21] Appl. No.: 94,394

[22] Filed: Nov. 14, 1979

Related U.S. Application Data

[60] Division of Ser. No. 34,514, Apr. 30, 1979, Pat. No. 4,232,090, which is a division of Ser. No. 348,771, Apr. 6, 1973, Pat. No. 4,187,258, which is a continuation-in-part of Ser. No. 156,923, Jun. 25, 1971, abandoned, which is a continuation-in-part of Ser. No. 887,333, Dec. 22, 1969, abandoned.

[51] Int. Cl.³ .............................................. C08L 1/14
[52] U.S. Cl. .................................... 260/15; 525/110; 525/160

[58] Field of Search ................... 525/110, 160; 260/15

[56] References Cited

U.S. PATENT DOCUMENTS

| | | | |
|---|---|---|---|
| 3,084,136 | 4/1963 | Chapin et al. | 525/160 |
| 3,098,835 | 7/1963 | Gaylord | 525/110 |
| 3,932,191 | 6/1976 | Jerabek et al. | 260/15 |

Primary Examiner—J. Ziegler
Attorney, Agent, or Firm—George D. Morris

[57] ABSTRACT

A primer composition comprises an oil-free saturated polyester resin, an aminoplast curing agent for the polyester, and a thermoplastic acrylic polymer. The primer is used as a bond coat to adhere an acrylic polymer dispersion topcoat to a metal base.

5 Claims, No Drawings

SEALERLESS PRIMERS

CROSS-REFERENCES TO RELATED APPLICATIONS

This application is a division of Application Ser. No. 34,514, filed Apr. 30, 1979, now U.S. Pat. No. 4,232,090, which is a division of Application Ser. No. 348,771, filed Apr. 6, 1973, now U.S. Pat. No. 4,187,258, which is a continuation-in-part of Application Ser. No. 156,923, filed June 25, 1971, now abandoned, which in turn is a continuation-in-part of Application Ser. No. 887,333, filed Dec. 22, 1969, now abandoned.

BACKGROUND OF THE INVENTION

This invention relates to primer compositions for metal substrates and topcoats formed from non-aqueous acrylic polymer dispersions.

Because acrylic polymers comprising mainly homopolymers and copolymers of acrylates and methacrylates form films having excellent gloss retention over long periods of exposure both outdoors and indoors, their use has become widespread, particularly in the automotive industry as finish coats for automobiles and other vehicles.

The preferred acrylic compositions to be used for forming films are produced by the dispersion polymerization of the acrylic monomer or monomers. These acrylic polymer dispersions have high solids content and thick films may be applied with the use of these dispersions in a minimal amount of time.

The expanding use of these coatings, however, has given rise to many problems. The biggest problem encountered is the relatively poor adhesion of these acrylic topcoats to metal surfaces, which in turn results in a low level of metal protection and a low level of rust inhibition of the painted metal surface. In order to overcome this shortcoming of coatings from acrylic dispersions, various primers have been developed which act as a bond between the topcoats and the metal surface. In other words, one of the chief requirements for the primer composition is that it have very good adhesion to both the metal substrate and to the topcoat material. It must also be capable of providing corrosion resistance.

In choosing a suitable composition to be used as a primer, it is quite the exception to find one which will form a good, strong, adhesive bond between the primer and the topcoat of acrylic dispersion composition. By their very nature, acrylic dispersions have poor adhesion because they have few polar groups such as are known to promote adhesion, and must rely primarily on mechanical adhesion.

In many instances, especially in the automotive industry, another midcoat is used as a sealer over the primer, both of which are covered by the acrylic topcoat. The conventional primers are usually produced with a high pigment-to-binder ratio on the order of about 45 percent to 50 percent by volume of the binder or vehicle. This high pigment-to-binder ratio provides for a composition which may be used to fill any discontinuities in the surface of the substrate and also provides a surface which may be sanded to a smooth and level base for the topcoat. Moreover, the sanded surface, because of the minute indentations from the sanding, provides much more surface area for contact between the topcoat and the primer substrate. It has been found that the sanded or unsanded surfaces of the primer composition are far from satisfactory, even though the adhesion between the primer coating and the topcoat is improved, because these high pigment-to-binder ratios produce a surface which results in poor "hold-out" of the acrylic topcoat; that is, the gloss of the topcoat is decreased by the minute roughness of the surfacer. It is also well known that high pigment-to-binder ratio primers may lack flexibility and resistance to chipping when abraded.

The prior art sealers used over the conventional primers to enhance the adhesion to the acrylic topcoat and to prevent the loss of plasticizer from the acrylic topcoat through the porosity of the prior art primers are usually produced with a low pigment-to-binder ratio similar to the ratios conventionally used in the topcoat and the sealer is selected to provide intercoat adhesion between the topcoat and primer.

It has not heretofore been possible to provide one composition which would in itself provide the adhesion properties necessary without the necessity of sanding and which is non-porous to the extent that acrylic dispersion topcoats are not altered due to the porosity of the primer.

A novel primer composition has now been found which requires no sealer composition or sanding to adhere to the acrylic dispersion topcoat and, therefore, on parts of the metal substrate having a good profile which requires no sanding to obtain the desired contour, the sealer and sanding may be omitted. Further, the intercoat adhesion between the acrylic topcoat and the primer is vastly improved over those prior art systems where both a primer and sealer which has been sanded are used. This novel primer composition is sufficiently non-porous so that the acrylic topcoat is not altered by its use without a sealer.

In accordance with the instant invention, the novel primer composition comprises an aminoplast curing agent, a saturated resin which is curable with the aminoplast curing agent and a thermoplastic acrylic polymer which is both essentially non-curable with the aminoplast curing agent and soluble in solvents in which it was soluble before curing of the primer composition. While pigmentation of the primer composition is desirable, extremely good adhesion may be obtained with very little or no pigment.

The saturated resin which is curable with the aminoplast curing agent may be a saturated resin having pendant hydroxyl groups. Examples of satisfactory resins are saturated polyesters, saturated polyethers, saturated polyurethanes and saturated polymers of ethylenically unsaturated monomers, all having hydroxyl functionality. Aliphatic polymers, although being unsaturated in a strictly technical sense, fall within the term "saturated" as used herein because such unsaturation does not enter into free-radical polymerization reactions.

The present invention includes the use of thermoplastic acrylic polymer in any of the various resinous primers comprising the oil-free saturated polyesters having hydroxyl functionality and aminoplast curing agents for said polyesters.

The polyesters used in the practice of this invention are oil-free saturated polyesters having hydroxy functionality. These polyesters are formed by the reaction of saturated dicarboxylic acids and polyfunctional polyols.

Some illustrated examples of the saturated dicarboxylic acids useful herein are succinic acid, adipic acid, suberic acid, azelaic acid, sebacic acid, isophthalic acid, terephthalic acid, tetrachlorophthalic acid, pimelic acid, hexachloroendomethylene-tetrahydrophthalic acid, and the like. The anhydrides of these acids, where the anhydrides exist, are, of course, embraced in the term "acid" since the polyesters obtained therefrom are the same.

A minor portion of the saturated dibasic acids may be replaced by their equivalent of unsaturated acids such as maleic acid, fumaric acid, aconitic acid, itaconic acid, and the like.

Examples of polyfunctional polyols useful in preparing the oil-free saturated polyester are glycerol, pentaerythritol, trimethylol propane and trimethylol ethane. Diols such as ethylene glycol, diethylene glycol, triethylene glycol, polyethylene glycol, propylene glycol, dipropylene glycol, polypropylene glycol and neopentyl glycol may also be included so long as on the average, the polyol has greater than two hydroxyl groups per molecule.

The polyols are generally employed in an equal molar ratio to the total acid components or as a slight excess as, for example, about 5 mol percent excess.

The polyethers used in the practice of this invention are the saturated polyethers having hydroxyl functionality. These polyethers may be formed by the reaction of epichlorohydrin and a saturated polyol. Usually the polyol is a diol such as a bisphenol, dihydric phenol or a glycol. The reaction product of epichlorohydrin and bisphenol A is the polyether most commonly used.

The polyurethanes used in the practice of this invention are the saturated polyurethanes having hydroxyl functionality. These polyurethanes may be formed by the reaction of a saturated diisocyanate and a saturated polyol or a saturated dicarboxylic acid having pendant hydroxyl groups. Exemplary polyols are glycerol, pentaerythritol, trimethylol propane and trimethylol ethane. Diols such as ethylene glycol and polyalkylene glycols and the polyoxyalkylene or polythioalkylene glycols may also be included so long as on the average, the polyol has greater than two hydroxyl groups per molecule. Saturated polyesters and polyesters having pendant hydroxyl groups and terminated by hydroxyl or carboxyl groups may be used.

The saturated polymers of ethylenically unsaturated monomers having hydroxyl functionality include polymers of the hydroxyacrylate and hydroxymethacrylates. Examples of saturated polymers of ethylenically unsaturated monomers include polymers and interpolymers of 2-hydroxyethylacrylate, 2-hydroxypropylacrylate, 4-hydroxybutylacrylate, 2-hydroxyethylmethacrylate, 3-hydroxypropylmethacrylate, 3-hydroxylbutylmethacrylate and 4-hydroxybutylethacrylate. Others include poly(vinyl alcohol) and poly(allyl alcohol).

Of the above polymers, the oil-free saturated polyesters having hydroxyl functionality are preferred.

The aminoplast curing agent for the polymers having hydroxyl functionality may be any aminoplast resin generally produced from the condensation of products of amines or amides with an aldehyde. The most common aminoplast resins are urea-formaldehyde and melamine-formaldehyde resins. However, condensation of other amines and amides can also be employed. For example, those of triazines, diazines, triazoles, guanidines, guanamines, and alkyl and aryl-substituted derivatives of such compounds, including aryl-substituted melamines, provided at least one amino group is present may be used. Some examples of such compounds are N,N'-dimethylurea, benzoguanamine, 6-methyl-2,4-diamino-1,3,5-triazine, 3,5-diaminotriazole, triaminopyrinidine, 2,4,6-triphenyltriamino-1,3,5-triazine, and the like. The aldehyde is most often formaldehyde, although similar condensation products can be made from other aldehydes such as acetaldehyde and butyraldehyde. In many cases, all or part of the alkylol groups of the condensation product are etherified by reaction with an alcohol to provide organic solvent-soluble materials. Any monohydric alcohol can be employed for this purpose, the preferred alcohols being methanol and butanol.

The thermoplastic acrylic polymer is essentially non-curable with the aminoplast curing agent. After curing of the primer composition, the thermoplastic acrylic polymer retains its thermoplastic characteristics and is soluble in solvents in which it was soluble before the curing. A thermosetting polymer, by comparison, will become substantially completely insoluble in such solvents after curing. Of course, an insignificant amount of crosslinking which does not cause the thermoplastic acrylic polymer to lose its thermoplastic characteristics is permissible.

Examples of thermoplastic acrylic polymers are addition polymers formed by polymerization of alpha-beta-ethylenically unsaturated monomers such as esters of ethylenically unsaturated carboxylic acids. Some of these preferred esters are polyalkyl acrylates and methacrylates such as methyl acrylate, ethyl acrylate, butyl acrylate, 2-ethyl hexyl acrylate, methyl methacrylate, ethyl methacrylate, butyl methacrylate 2-ethyl hexyl methacrylate, and the like. It is preferred to use poly alkyl acrylates and methacrylates wherein the alkyl group contains 8 carbon atoms or less.

The thermoplastic acrylic polymer herein may be a homopolymer or interpolymer formed by interpolymerizing with other ethylenically unsaturated compounds to yield the additional interpolymers. A particularly preferred thermoplastic acrylic polymer is formed by interpolymerizing the reaction product of a polymerizable ethylenically unsaturated carboxylic acid and an imine with an alkyl acrylate or alkyl methacrylate. Preferable carboxylic acids are acrylic acid and methacrylic acid, preferable imines are alkylene imines such as ethylene imine and the like, and the preferred alkyl acrylate or methacrylate is methyl methacrylate.

The most preferred thermoplastic acrylic polymers are interpolymers of acrylic or methacrylic acid with imines.

Any imine-containing compound which will react with a carboxylic acid may be used. Generally the imine-containing compounds are the alkylene imines and substituted alkylene imines. The preferred class of such imines are those of the formula:

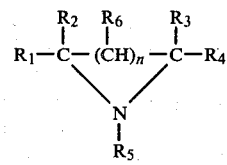

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; alkaryl, such as tolyl, xylyl or the like, or aralkyl, such as benzyl, phenethyl or the like. $R_6$ in the above formula is hydrogen or a lower alkyl radical usually having not more than about 6 carbon atoms, and n is an integer from 0 to 1.

It is intended that the groups designated by the above formula include substituted radicals of the classes indicated where the substitutent groups do not adversely affect the basic nature of the imine in the reaction and where the substitutents do not react with the aminoplast curing agent to transform the thermoplastic polymer to a thermoset polymer. Of course, minor amounts of reactive substituents which provide inconsequential numbers of crosslinks upon cure and which do not cause the thermoplastic acrylic polymer to lose its thermoplastic characteristics may be tolerated. Such substituents can include the groups such as cyano, halo, amino, alkoxy, carbalkoxy, and nitrile. The substituted groups may thus be cyanoalkyl, haloalkyl, aminoalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkyleneimine (whether or not within the above formula) does not depend upon the particular nature of any of the substituents, but rather the imine linkage; thus, beneficial results are obtained with interpolymers modified by any of those compounds within the above class.

A number of specific examples of alkyleneimines within the class described are as follows:
Ethylenimine (aziridine)
1,2-propylenimine (2-methyl aziridine)
1,3-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Aminoethyl ethylenimine (2-(2-aminoethyl)aziridine)
2-methyl propylenimine (2-methyl aziridine)
3-chloropropyl ethylenimine (2-(3-chloropropyl)aziridine)
p-chlorophenyl ethylenimine (2-(4-chlorophenyl)aziridine)
Methoxyethyl ethylenimine (2-(2-methoxyethyl)aziridine)
Dodecyl aziridinyl formate (dodecyl 1-aziridinyl carboxylate)
Carbethoxyethyl ethylenimine (2-(2-carboethoxyethyl)aziridine)
N-ethyl ethylenimine (1-ethyl aziridine)
N-butyl ethylenimine (1-butyl aziridine)
N-(2-aminoethyl)ethylenimine (1-2-aminoethyl)aziridine)
N-(phenethyl)ethylenimine (1-(2-phenylethyl)aziridine)
N-(cyanoethyl)ethylenimine (1-cyanoethyl aziridine)
N-phenyl ethyleneimine (1-phenyl aziridine)
N-tolyl ethylenimine (1-(2-methylphenyl)aziridine)
N-(p-chlorophenyl)ethylenimine (1-(4-chlorphenyl)aziridine)

When only small amounts (usually less than about three percent by weight of the thermoplastic acrylic polymer) of the imine are used, hydroxyalkyl alkyleneimines and N-hydroxyalkyl alkyleneimines may be employed. The crosslinking provided by the hydroxyl groups is insignificant and does not cause the thermoplastic acrylic polymer to lose its thermoplastic characteristics. Examples of these compounds are hydroxyethyl ethyleneimine (2-(2-hydroxyethyl)aziridine) and N-(2-hydroxyethyl) ethyleneimine (1-(2-hydroxyethyl)aziridine).

Because of their availability and because they have been found to be among the most effective, the preferred imines are alkyleneimines and substituted alkyleneimines having 2 to 4 carbon atoms, and especially ethylenimine, 1,2-propylenimine.

The reaction with the imine takes place upon admixing the imine and the carboxyl-containing material and heating to moderate temperatures, say 50° C. to 150° C., although higher or lower temperatures can be used, depending upon the desired reaction time. The imine reacts with the acidic carboxyl groups, but the exact nature of the reaction which takes place under these circumstances and the structure of the product obtained are not known with certainty. In the case of the preferred ethylenimine and 1,2-propylenimine, the reaction, to some extent at least, involves the production of a primary amino group, which has been hitherto unobtainable in this class of material. Provided that at least some imine-modification is attained, the improved properties are achieved when all or part of the carboxyl groups present are reacted with the imine, the extent of reaction being based upon the amount of imine employed.

The reaction with the imine is preferably carried out during or after the interpolymerization of the acid and the other monomers. While often the imine reaction is carried out after the acid-containing polymer has been produced, it has been found that some saving of time without any sacrifice in properties is achieved by carrying out the reaction with imine concurrently with the interpolymerization reaction. In this embodiment, the imine is added to the polymerization mixture at any point prior to the completion of the polymerization reaction. Preferably, the imine is added after the monomers, but before the polymerization is substantially advanced.

The polymerization reaction is otherwise carried out in a convention manner, utilizing heat and/or catalysts and varying solvents and techniques. Generally, a free-radical catalyst, such as cumene hydroperoxide, benzoyl peroxide or similar peroxygen compound, or an azo compound, is employed. When the polymerization reaction and the reaction with imine are conducted concurrently as described above, azo compounds, and especially alpha, alpha-azobis(isobutyronitrile), are preferred as the catalyst.

The interpolymer preferably comprises from about 30 percent to about 70 percent by weight of the reaction product of the poly(monohydroxy) acid and ethylenically unsaturated compound, from about 30 percent by weight to about 70 percent by weight of the alkyl acrylate or methacrylate and from about 0.2 percent to about 20 percent by weight of the reaction product of the carboxylic acid.

The novel primer composition comprises from about 40 percent by weight of resin solids to about 80 percent by weight of resin solids of the curable saturated resin, from about 5 percent to about 40 percent by weight of the aminoplast crosslinking agent, and from about 2 percent to about 20 percent by weight of the thermoplastic acrylic polymer.

The primer composition will preferably contain, in addition to the curable saturated resin, aminoplast, and thermoplastic acrylic polymer, adhesion promoting additives such as cellulose acetate butyrate, compounds such as copolymers of vinyl resins containing hydroxyl components in minor proportions which function as anti-settling agents for pigments, corrosion-resistant additives such as epoxy resins and catalysts for the crosslinking of the curable saturated resin with the aminoplast.

Various cellulose acetate butyrates, which may be used in the practice of the instant invention, include those having at least 25 percent of the ester units substituted with the butyral residue. It is preferred, however, that at least 35 percent of the units be butyrate units.

percent to about 10 percent by weight of the resinous components of the primer.

In order to increase the adhesion of the primer to the metal substrate and to enhance corrosion resistance, an epoxide resin is generally included in the primer composition.

The epoxide resin additive which may be utilized in the primer compositions of this invention may vary slightly in chemical structure. These materials, which are ordinarily polyglycidyl ethers of bisphenols, or polyether derivatives of polyhydric phenols containing epoxide groups, are formed by the reaction of bisphenols with epichlorohydrin, and range from viscous liquids to hard, brittle resins. A representative epoxy resin structure may be illustrated as follows:

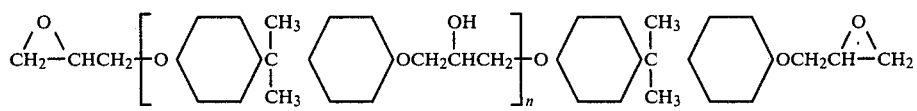

The following table sets forth various commercially available cellulose acetate butyrates which may be used with the compositions of the instant invention.

In the foregoing structure, n is a number of a magnitude dependent upon the degree to which the etherification is carried. The most simple epoxy resin will be free

TABLE 1

| Type No.[1] | Viscosity Range Seconds | Viscosity Range Poises | Average Acyl Content Acetyl (Percent) | Average Acyl Content Butyryl (Percent) | Color Maximum (p.p.m.) | Haze Maximum (p.p.m.) |
|---|---|---|---|---|---|---|
| EAB-272-3 | 2.4–3.6 | 9.0–13.5 | 20.5 | 26 | 175 | 35 |
| EAB-272-20 | 15–35 | 56–131 | 20.5 | 26 | 175 | 35 |
| Half-second | 0.3–0.5 | 1.28–2.08 | 13.0 | 37 | 125 | 35 |
| EAB-381-2 | 1–3.5 | 3.8–13.1 | 13.0 | 37 | 125 | 35 |
| EAB-381-20 | 17–33 | 64–124 | 13.0 | 37 | 125 | 35 |
| EAB-500-1 | 0.8–1.2 | 3.0–4.5 | 6.0 | 48 | 125 | 35 |
| EAB-500-5 | 4.0–6.0 | 15.0–22.5 | 6.0 | 48 | 125 | 35 |

[1]Trademarks of cellulose acetate butyrate sold by Eastman Kodak Company.
Viscosity - ASTM Method D-1343-56 (Formula A).
Color - Platinum-Cobalt Standard.
Haze - Arthur H. Thomas Ruller's Earth Standards.
Acetyl and Butyryl Content - ASTM Method D-817-57.

It is preferred that the primer composition comprise from about 1 percent by weight to about 15 percent by weight of the cellulose acetate butyrate component.

The primer composition preferably contains a component such as hydroxyl-containing copolymers or interpolymers of vinyl halide and vinyl ester which function to provide improved pigment suspension. The vinyl halide is the predominant component in the copolymers or interpolymers, ordinarily being present in an amount of about 75 percent to 95 percent by weight, while the ester of an aliphatic monocarboxylic acid is present in an amount of about 5 percent to 15 percent by weight, although these proportions can be varied if desired.

The vinyl resin also contains a hydroxyl component in a minor proportion, ordinarily in an amount of about 1 percent to 10 percent by weight calculated as hydroxyl. One particularly useful vinyl resin contains approximately 90 percent vinyl chloride, approximately 5 percent vinyl acetate, and approximately 2 percent hydroxyl component (approximately 6 percent when calculated as vinyl alcohol). The above vinyl resin is readily available as a commercial product, as are other vinyl halidevinyl ester copolymers which may be utilized in air-drying flash primer compositions. One particularly desirable commercial resin is VAGH. The vinyl resin is ordinarily utilized in an amount of about 1 of functional groups other than epoxide and hydroxyl groups, and will contain at least 4 carbon atoms, as illustrated by 1,2-epoxy-3,4-epoxy butane. More complex epoxy resins, such as those which result from the reaction of two or more moles of a diepoxide with one mole of a dihydric phenol, or from the reaction of three or more moles of a diepoxide with one mole of a trihydric phenol, and diepoxides or polyepoxides derived from polyhydric alcohols such as sorbitol, pentaerythritol, or polyallyl alcohols, may also be used. Among the many phenolic compounds utilized in the preparation of epoxy resins are included the following:
Bis(4-hydroxy-phenyl)2,2-propane
4,4'-Dihydroxybenzophenone
Bis(4-hydroxy-phenyl)1,1-ethane
Bis(4-hydroxy-phenyl)1,1-isobutane
Bis(4-hydroxy-phenyl)2,2-butane
Bis(4-hydroxy-tertiary butyl phenyl)2,2-propane
Bis(2-hydroxy-naphthyl)methane
1,5-Dihydroxy-naphthalene The epoxy component of the epoxy resins may be selected from compounds of the following group:
1-Chloro-2,3-epoxy propane (epichlorohydrin)
1-Chloro-2,3-epoxy butane
1-Chloro-3,4-epoxy butane
2-Chloro-3,4-epoxy butane
1-Chloro-2-methyl-2,3-epoxy butane 1-Bromo-2,3-epoxy pentane
2-Chloromethyl-1,2-epoxy butane
1-Bromo-4-methyl-3,4-epoxy pentane
1-Bromo-4-ethyl-2,3-epoxy pentane
4-Chloro-2-methyl-2,3-epoxy pentane
1-Chloro-2,3-epoxy octane
1-Chloro-2-methyl-2,3-epoxy octane
1-Chloro-2,3-epoxy decane The liquid epoxy resin (those having a molecular weight below 500 and preferably in the range of about 350–450) can be employed with the instant invention. The solid resins are undesirable because they are incompatible with the other components and also because they destroy the adhesion to the acrylic topcoat. The commercially available epoxy resins which may be used with the instant invention include the lower members of the Epon series as Epon 1001 and those having lower molecular weights.

The quantity of the epoxide resin additive which may be blended with the other resinous components to form primer compositions may be varied considerably. For example, amounts as low as about 2 percent will enhance the corrosion resistance properties of the coating compositions. On the other hand, amounts as high as 20 percent by weight of the resinous components can also be employed. Preferably, the amount of epoxide resin additive employed is within the range of about 2 percent to 8 percent by weight of the resinous components of the compositions.

The primer composition may also contain catalysts to promote the crosslinking of the curable saturated resin by the aminoplast. Examples of such catalysts include paratoluene sulfonic acid, phenyl acid phosphate, butyl acid phosphate, phosphoric acid, and the like. The catalyst, if used, preferably comprises from about 0.01 percent to about 0.1 percent by weight of the primer composition.

The primer composition may be pigmented if desired. Any pigment commonly included in primer compositions for metal substrates and acrylic dispersion topcoats such as carbon black, iron oxide, lithopone, magnesium silicate, silica, barium sulfate, $TiO_2$, chrome yellow, calcium chromate, strontium chromate, and zinc potassium chromate may be used and the primer is pigmented by grinding pigments in a portion of the curable saturated resin and adding to the primer composition.

The pigment-to-binder ratio of the primer may be as much as 4:1 depending upon the condition of the metal substrate. It is preferred, however, to use a primer having a pigment-to-binder ratio of about 1:1.

No special expedients are necessary in formulating the primer compositions of this invention. For example, they may be prepared simply by incorporating the resinous components in a suitable solvent system by simple agitation or each resinous component may be dissolved in a solvent and the resulting solutions combined to form finished primer compositions.

The solvent system may be any suitable combination of organic solvents. One particularly useful solvent system includes toluene, and methyl ethyl ketone, isobutyl acetate, xylene, Cellosolve acetate, and acetone with the toluene, acetone, and ethyl alcohol comprising the predominant components of this system. Other solvents which may be employed include terpenes, aliphatic and aromatic naphthas, and the like. Ordinarily the solvent will comprise about 40 percent to 80 percent by weight of the total coating compositions, although of course larger or smaller amounts may be utilized depending upon the solids content desired. For example, it may be desirable to formulate the primer with a relatively high solids content and then reduce it to spraying consistency prior to the time of application.

The metal substrate is preferably aluminum, steel, or phosphated cold-rolled steel, however, any metal used as a construction material is usable.

The primer composition may be coated on to the metal base in any conventional manner such as roll coating, brushing, curtain coating, etc. The preferred method of applying the primer composition to the metal is by spraying.

The primer, then, is generally thinned to from about 30 to about 50 percent solids content for spraying purposes with conventional thinners such as aromatic hydrocarbons, commercial petroleum cuts which are essentially aromatic, and the like, and sprayed on to the metal base and baked at about 250°–400° F. to cure the primer composition.

The acrylic dispersions which are used as topcoats in the instant invention are non-aqueous dispersions of acrylic polymers formed by dispersion polymerizing acrylic monomer or acrylic co-monomers in an organic liquid in which it is soluble but in which the resulting polymers are insoluble to form dispersed polymer particles. The reaction is carried out in the presence of a stabilizer having in its molecule (1) a constituent which becomes associated with the dispersed polymer particles and (2) a constituent having a pendant chain-like structure which is solvated by the organic liquid and provides a stabilizing sheath around the polymer particles. Such acrylic dispersions are described in detail in co-pending application Ser. No. 808,403, filed Mar. 19, 1969. The preferred acrylic monomer to be polymerized is methyl methacrylate. The dispersion is then thinned and sprayed on to the primer composition and dried to form the coated metal article.

The following examples are given by way of illustration and not by way of limitation. All parts and percentages are by weight unless otherwise specified.

EXAMPLE 1

A primer composition was prepared in the following manner:

A pigment paste was prepared by mixing 13.28 parts of $TiO_2$, 2.39 parts of basic lead silico chromate, 2.34 parts of the zinc oxide, 2.39 parts of molacco black, 65.80 parts of calcined clay, 66.20 parts of silica, 71.10 parts of barium sulphate, 83.80 parts of ethyl Cellosolve, 36.40 parts of isopropyl alcohol and 32 parts of an oil-free saturated polyester having the following composition:

| Components | Parts |
| --- | --- |
| 1,6-hexanediol | 147 |
| 1,1,1-Trimethylol propane | 92.6 |
| Adipic acid | 100.8 |
| Isophthalic acid | 171.8 |

The mixture was ground into a pigment paste in a steel ball mill.

The primer composition was formed by mixing 186 parts of the pigment paste, 71 parts of the above-described oil-free saturated polyester, 15 parts of methylated melamine formaldehyde resin, 10 parts of VAGH solution (interpolymer solution of 91 parts of vinyl chloride, 3 parts vinyl acetate and 6 parts of vinyl alcohol of 20 percent solids in a 50-part methyl isobutyl ketone, 50 part xylene solvent mixture), 35 parts of a 20 percent solids half-second cellulose acetate butyrate solution in methyl isobutyl ketone and toluene, 14 parts of epoxide resin (Epon 1001), 14 parts of an acrylic component comprising 98.5 percent methyl methacrylate and 1.5 percent of 2-(2-hydroxyethylamino) ethyl methacrylate, 2 parts of paratoluene sulfonic acid, 37 parts of Cellosolve acetate, and 16 parts of isopropyl alcohol.

EXAMPLE 2

A primer composition was formed by mixing 186 parts of the pigment paste described in Example 1, 65 parts of the oil-free saturated polyester described in Example 1, 14 parts of methylated melamine formaldehyde resin, 10 parts of VAGH solution, 35 parts of a 20 percent solids half-second cellulose acetate butyrate solution in methyl isobutyl ketone and toluene, 14 parts of an epoxy resin (Epon 1001), 29 parts of an acrylic component comprising 98.5 percent methyl methacrylate and 1.5 percent of 2-(2-hydroxyethylamino) ethyl methacrylate, 2 parts of paratoluene sulfonic acid, 31 parts of Cellosolve acetate, and 14 parts of isopropyl alcohol.

EXAMPLES 3-5

Primer compositions were formed as in Example 1 substituting the following oil-free saturated polyesters for the polyesters of Example 1:

| Example | Components | Parts |
| --- | --- | --- |
| 3 | Neopentyl glycol | 84.2 |
|   | 1,1,-Trimethylol propane | 57.7 |
|   | Azelaic acid | 84.2 |
|   | Isophthalic acid | 111.7 |
|   | Hydroxyethyl ethylene amine | 2.4 |
| 4 | Neopentyl glycol | 145.8 |
|   | Adipic acid | 111.8 |
|   | Isophthalic acid | 190.8 |
|   | 1,1,-Trimethylol propane | 102.6 |
| 5 | Neopentyl glycol | 82.5 |
|   | 1,1,-Trimethylol propane | 58.9 |
|   | Sebacic acid | 88.7 |
|   | Isophthalic acid | 109.4 |

EXAMPLES 6 and 7

The primer compositions of Examples 1 and 2 were coated on to metal substrates and topcoated with acrylic dispersion coatings and compared to a conventional primer coated on to the same metal base and topcoated with the same acrylic dispersion.

One mil thick coatings of the primers of Examples 1 and 2 were prepared by reducing the primer compositions to a total solids content of 42 percent with a solvent comprising 50 percent ethyl Cellosolve and 50 percent isopropyl alcohol and spraying on to phosphated cold-rolled steel substrates and baked for 45 minutes at 285° F. The two primed metal surfaces were then topcoated with an acrylic dispersion comprising 99.25 percent methyl methacrylate, 0.75 percent of the reaction product of methacrylic acid and 2-hydroxyethyl ethylene imine, 6.6 percent by weight of the resin of a commercial acrylic dispersion stabilizer, 0.206 percent octyl mercaptan, and 0.6 percent azobis-(isobutyronitrile), and a solvent solution comprising 50 percent naphtha, 25 percent hexane, and 25 percent heptane. The polymer dispersion was coated on to the two primed metal substrates and heated to 285° F. for 30 minutes. The resulting coated articles were labelled Example 6 and Example 7.

A conventional primer composition comprising 186 parts of the pigment paste described in Example 1, 71 parts of the oil-free saturated polyester of Example 1, 15 parts of methylated melamine formaldehyde resin, 35 parts of a 20 percent solids half-second cellulose acetate butyrate solution in methyl isobutyl ketone and toluene, 14 parts of Epon 1001, 10 parts of VAGH solution, 11 parts of ethylene glycol diacetate, 28 parts of petroleum xylene, and 16 parts of isopropyl alcohol was then coated on to a phosphated cold-rolled steel substrate and baked at 285° F. for 45 minutes and topcoated with the same acrylic dispersion as that used for Examples 6 and 7 and heated to 285° F. for 30 minutes. This resulting prior art article was labeled Example A.

The adhesion of the topcoat to the metal of the three Examples was measured by the knife method and the gravelometer test.

The knife method comprises gouging a groove into the surface of the coating with the flat tip of the knife and obseving the manner in which the coating is removed. If the adhesion is poor, the coating will break freely away from the substrate.

The gravelometer test consists of projecting a standardized road gravel by means of a controlled air blast on to a suitable test panel. The testing apparatus is contained in a box on wheels called a "Gravelometer" designed to contain road gravel, a test panel holder, and a gravel projecting mechanism. The projecting mechanism located in front of the test panel consits of an air nozzle in the base of an inverted pipe T. The stem of the pipe T points upward and is connected to a funnel into which the gravel is poured. The gravel falling into the air blast is projected forward and impacts upon the test panel which is held perpendicular to the impinging gravel. All testing is conducted under controlled temperature conditions—generally room temperature or 0° F. After gravel impact, masking tape is applied to remove any loose paint chips remaining on the panel and the degree of chipping is determined by visual comparison with a standard SAE (Society of Automotive Engineers) J-400 chipping rating standards or by counting the number and sizes of all chips.

The test showed that both of the metal articles of Example 6 and Example 7 were markedly superior to that of Example A in that both Examples 6 and 7 showed fewer and smaller chips than did Example A in the gravelometer test, and removal of the coating of Examples 6 and 7 was difficult whereas the coating of Example A broke away rather easily.

EXAMPLE 8

A primer composition was prepared in the following manner:

A pigment paste was prepared by mixing 13.28 parts of $TiO_2$, 2.39 parts of basic lead silico chromate, 2.34 parts of the zinc oxide, 2.39 parts of molacco black, 65.80 parts of calcined clay, 66.20 parts of silica, 71.10 parts of barium sulphate, 83.80 parts of ethyl Cellosolve, 36.40 parts of isopropyl alcohol and 32 parts of an oil-free saturated polyester having the following composition:

| Components | Parts |
| --- | --- |
| 1,6-hexanediol | 147 |
| 1,1,1-Trimethylol propane | 92.6 |
| Adipic acid | 100.8 |
| Isophthalic acid | 171.8 |

The mixture was ground into a pigment paste in a steel ball mill.

The primer composition was formed by mixing 186 parts of the pigment paste, 71 parts of the above-described oil-free saturated polyester, 15 parts of methylolated melamine formaldehyde resin, 10 parts of VAGH solution (interpolymer solutin of 91 parts of vinyl chloride, 3 parts vinyl acetate and 6 parts of vinyl alcohol of 20 percent solids in a 50-part methyl isobutyl ketone, 50 part xylene solvent mixture), 35 parts of a 20 percent solids half-second cellulose acetate butyrate solution in methyl isobutyl ketone and toluene, 14 parts of an epoxide resin (Epon 1001), 10 parts of methyl methacrylate polymer, 2 parts of paratoluene sulphonic acid, 37 parts of cellosolve acetate, and 16 parts of isopropyl alcohol.

The primer composition provides excellent adhesion between metals and acrylic topcoats.

Although specific examples have been set forth hereinabove, it is not intended that the invention is limited solely thereto but to include all of the variations and modifications falling within the scope of the appended claims.

I claim:

1. A primer composition comprising:
   a. an aminoplast curing agent produced from the condensation products of amines or amides with aldehydes;
   b. an oil-free saturated polyester having hydroxyl functionality which is curable with said curing agent to form a thermoset polymer; and
   c. a thermoplastic acrylic polymer which
      (1) is selected from the group consisting of addition polymers of esters of alpha-beta ethylenically unsaturated acids and interpolymers of esters of alpha-beta ethylenically unsaturated acids with other ethylenically unsaturated compounds;
      (2) is essentially non-curable with said aminoplast curing agent;
      (3) after curing of the primer composition, is soluble in solvents in which it was soluble before said curing; and
   d. cellulose acetate butyrate.

2. A primer composition comprising:
   a. an aminoplast curing agent produced from the condensation products of amines or amides with aldehydes;
   b. an oil-free saturated polyester having hydroxyl functionality which is curable with said curing agent to form a thermoset polymer; and
   c. a thermoplastic acrylic polymer which
      (1) is selected from the group consisting of addition polymers of esters of alpha-beta ethylenically unsaturated acids and interpolymers of esters of alpha-beta ethylenically unsaturated acids with other ethylenically unsaturated compounds;
      (2) is essentially non-curable with said aminoplast curing agent;
      (3) after curing of the primer composition, is soluble in solvents in which it was soluble before said curing; and
   d. hydroxyl-containing copolymer or interpolymer of vinyl halide and vinyl ester.

3. A primer composition comprising:
   a. an aminoplast curing agent produced from the condensation products of amines or amides with aldehydes;
   b. an oil-free saturated polyester having hydroxyl functionality which is curable with said curing agent to form a thermoset polymer; and
   c. a thermoplastic acrylic polymer which
      (1) is selected from the group consisting of addition polymers of esters of alpha-beta ethylenically unsaturated acids and interpolymers of esters of alpha-beta ethylenically unsaturated acids with other ethylenically unsaturated compounds;
      (2) is essentially non-curable with said aminoplast curing agent;
      (3) after curing of the primer composition, is soluble in solvents in which it was soluble before said curing; and
   d. epoxy resin.

4. A primer composition comprising:
   a. from about 5 to about 40 percent by weight of an aminoplast curing agent produced from the condensation products of amines or amides with aldehydes;
   b. from about 40 to about 80 percent by weight of an oil-free saturated polyester having hydroxyl functionality which is curable with said curing agent to form a thermoset polymer; and
   c. from about 2 to about 20 percent by weight of a thermoplastic acrylic polymer which
      (1) is selected from the group consisting of addition polymers of esters of alpha-beta ethylenically unsaturated acids and interpolymers of esters of alpha-beta ethylenically unsaturated acids with other ethylenically unsaturated compounds;
      (2) is essentially non-curable with said aminoplast curing agent;
      (3) after curing of the primer composition, is soluble in solvents in which it was soluble before said curing;
   d. from about 1 to about 15 percent by weight of cellulose acetate butyrate;
   e. from about 1 to about 10 percent by weight of a hydroxyl-containing copolymer or interpolymer of a vinyl halide and a vinyl ester; and
   f. from about 2 to about 10 percent by weight of an epoxy resin.

5. The primer composition of claim 4 wherein the epoxy resin is a glycidyl ether of a polyhydric phenol.

* * * * *